No. 763,175. PATENTED JUNE 21, 1904.
E. H. GOLD.
HOSE COUPLING.
APPLICATION FILED MAR. 14, 1904.
NO MODEL.
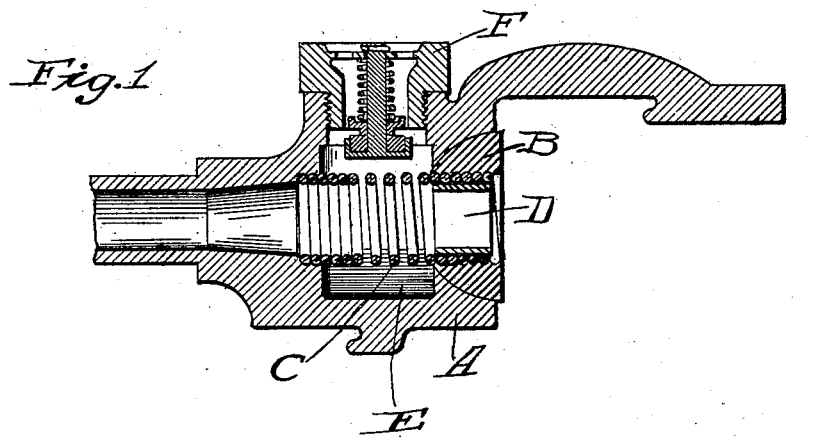
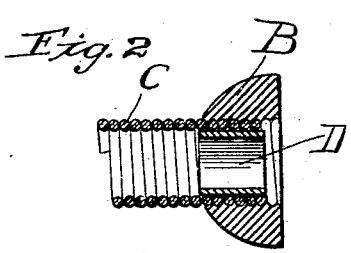 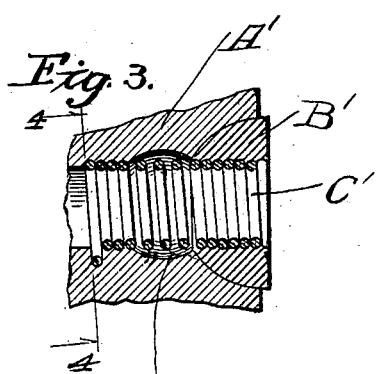
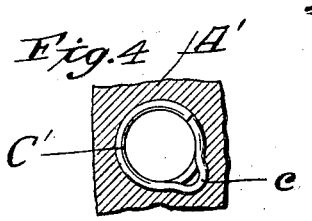
Witnesses:
J B Weir
Oliver L Plumtree
Inventor
Egbert H. Gold
By Raymond & Barnett
Attys.

No. 763,175.                                      Patented June 21, 1904.

UNITED STATES PATENT OFFICE.

EGBERT H. GOLD, OF CHICAGO, ILLINOIS.

HOSE-COUPLING.

SPECIFICATION forming part of Letters Patent No. 763,175, dated June 21, 1904.

Original application filed April 10, 1902, Serial No. 102,197. Divided and this application filed March 14, 1904. Serial No. 198,099. (No model.)

*To all whom it may concern:*

Be it known that I, EGBERT H. GOLD, a citizen of the United States, residing at Chicago, in the county of Cook and State of Illinois, have invented certain new and useful Improvements in Hose-Couplings, of which the following is a specification.

This application is a division of my application No. 102,197, filed April 10, 1902.

My invention relates more particularly to improvements in the means for attaching gaskets to their seats in coupler-heads, especially so as to provide what is known as a "rocking" gasket, which shall be freely movable upon its seat and yet shall be firmly held to its seat. These and such other objects as may hereinafter appear are attained by the devices illustrated in the accompanying drawings, in which—

Figure 1 is a longitudinal sectional view of a steam-pipe coupler-head fitted with my improvements. Fig. 2 is a detail of the gasket and its attaching means. Fig. 3 is a sectional detail of a modification thereof, and Fig. 4 is a vertical view on the line 4 4 of Fig. 3.

Like letters of reference indicate the same parts in the several figures of the drawings.

Referring by letter to the accompanying drawings, A indicates one of the duplicate halves or members of a train-pipe coupling.

B is the gasket, made, preferably, of compressible material or of material which is more or less plastic when heated, although a metal gasket may be used. This gasket is preferably of an approximately hemispherical shape and is seated in a correspondingly-shaped gasket-seat. Secured to the gasket B is an attaching member C, which consists of a coiled spring. This coiled spring may be readily secured to the gasket by threading it into the gasket, as shown in the detailed figure, and may be further locked in position by inserting a bushing D inside of that portion of the coiled spring which is threaded into the gasket. Obviously other methods of attaching the coiled spring to the gasket may be used.

The coiled spring projects from the rear end of the gasket, so as to leave a free end, which is threaded into a screw-thread provided therefor in the steam-passage which extends through the coupler-head.

If it be desired to securely hold the gasket to its seat by tension other than that which would be obtained by a mere threading of the coiled spring into the coupler-head, I provide in the coupler-head an open space E, across which a portion of the spring extends, the spring engaging the screw-thread in the coupler-head beyond such open space, so that when the spring is threaded into such screw-thread a sufficient distance that portion of the spring which extends across said open space will be drawn apart, thereby developing a tension which serves to hold the gasket B yieldingly to its seat.

The open space referred to may be provided by the passage-way leading to the relief-valve F, which is usually mounted in one side of the coupler-head.

It will be seen that with this device the gasket will be held to its seat under tension and by flexible means, which may be utilized so as to permit a yielding rocking of the gasket upon its seat. It should be understood, however, that while I consider my attachment especially adapted for use with a rocking gasket and while I prefer using it with a hemispherical gasket held under tension to a hemispherical seat nevertheless I consider my means for attaching the gasket as a simple, effective, and desirable means, no matter what the shape of the gasket may be and regardless of whether or not the gasket shall move freely upon its seat when secured in position with my attaching device. With this understanding of my invention it is obvious that various departures may be made from the exact embodiment thereof heretofore described without departing from my invention.

In Figs. 3 and 4 I have shown a modification of the device shown in Figs. 1 and 2, the section of the coupler-head being indicated as A', the gasket as B', and the attaching-spring as C'. In this modified form I have shown a simple and convenient means for locking the spring, to wit: The central passage through the coupler-head is enlarged just beyond the screw-threads which engage the spring, and one coil of the spring C′, preferably the end coil, is bent to form a spring-shoulder c, which shoulder will spring into the enlarged portion of the steam-passage through the coupler-head and will serve to prevent any accidental unscrewing of the spring C′ from the coupler-head.

I claim—

1. As a new article of manufacture, a gasket provided with a coiled spring, having a portion thereof secured to said gasket, and a portion thereof extending from one end of said gasket, substantially as and for the purpose described.

2. The combination with a coupler-head provided with a gasket-seat, of a gasket, means for holding said gasket to said seat, said means comprising a coiled spring secured to said gasket, and means within said coupler-head for engaging said coiled spring.

3. The combination with a hose-coupling provided with a seat for a gasket and with internal screw-threads extending inwardly from said gasket-seat, of a gasket provided with flexible means for engaging said screw-threads to hold said gasket upon said seat, substantially as described.

4. As a new article of manufacture, a gasket having a coiled spring secured in a central opening through said gasket, a portion of said coiled spring projecting from one side of said gasket, and a bushing mounted within that portion of the coiled spring which is within the gasket, so as to secure the coiled spring within the gasket.

5. The combination with a coupler-head, of a gasket, said coupler-head being provided with a seat for said gasket, and a coiled spring secured within said gasket, a portion of said coiled spring extending within a central opening through the coupler-head and engaging suitable attaching means, a portion of said spring between said gasket and said attaching means being under tension, substantially as described.

6. The combination with a coupler-head provided with a gasket-seat and provided with a steam-passage extending longitudinally through the coupler-head from said gasket-seat, a portion of said passage beyond said gasket-seat being enlarged and a portion of said passage beyond said enlarged portion being reduced in diameter and provided with screw-threads, a gasket adapted to said seat and a coiled spring secured within said gasket and having a portion thereof adapted to extend beyond said gasket and across said enlarged portion of the central opening through the coupler-head, and a portion thereof adapted to engage the screw-thread in the smaller part of the passage through said coupler-head, substantially as described.

7. The combination with a coupler-head provided with a longitudinal passage therethrough, of a gasket adapted to one end of said coupler adjacent to said passage, said coupler-head being provided with internal screw-threads in the walls of said passage, said passage being enlarged beyond said screw-threaded portion and said gasket being provided with a coiled spring extending rearwardly therefrom and adapted to engage said screw-threads, said coiled spring being provided with a projecting portion adjacent to the farther end thereof and arranged to normally extend beyond the main body of the spring, said projecting portion being arranged to project into said enlarged portion of said longitudinal passage through the coupler-head.

EGBERT H. GOLD.

Witnesses:
O. R. BARNETT,
G. Y. DANKWARD.